United States Patent Office 3,519,572
Patented July 7, 1970

3,519,572
BLOOD CONTROL
Donald A. Kita, Jackson Heights, N.Y., assignor to Chas. Pfizer & Co., Inc., New York, N.Y., a corporation of Delaware
No Drawing. Filed Oct. 3, 1966, Ser. No. 583,934
Int. Cl. G01n 33/00
U.S. Cl. 252—408                                 7 Claims

ABSTRACT OF THE DISCLOSURE

A process for the production of a stabilized, lyophilized preparation of lysed red blood cells standardized for use as a control for hemoglobin determinations in mammalian, especially human blood.

---

This invention relates to a method for the preparation of a hemoglobin control product. In particular, it relates to a process for the production of a stabilized, lyophilized preparation of lysed red blood cells standardized for use as a control for hemoglobin determinations of blood.

The estimation of hemoglobin is one of the most important tests performed in a complete blood analysis. Under normal conditions, it is contained only in the red blood cells, and so the hemoglobin concentration, normally expressed in terms of grams per 100 ml. of whole blood, may vary directly with the red blood cell count. Those conditions in which the number of erythrocytes or the concentration of hemoglobin is below normal are called anemias, and may be caused by such factors as loss of blood, destruction of blood, or faulty formation of blood. The determination of hemoglobin content offers the simplest and most certain means for detecting the presence and degree of anemia, and of judging the effectiveness of the treatment thereof.

An increased hemoglobin content is usually accompanied by an increase in the number of erythrocytes, a condition which is associated with shock or dehydration, and with cardiac or pulmonary disorders. Subjection to high altitudes, i.e., low oxygen pressure, can also result in this condition.

Previously available products for checking the accuracy of hemoglobin assays have suffered from the disadvantages of poor stability and/or inconvenient methods of use. These difficulties include, among others, the frequent need to discard unused sample due to limited stability, the need to add additional reagents prior to use, and the need to resuspend the preparation prior to each use.

It is the object of this invention to provide a hemoglobin control product which overcomes the disadvantages mentioned above. When stored at from about 4° C. to about 10° C., the product of this invention is stable in the dry state for about one year, and after reconstitution, it is stable for about 6 months. Also, upon reconstitution, the product is a homogeneous solution, which, unlike other products, requires neither resuspension nor the addition of reagents prior to use.

The novel method of this invention comprises:

(a) Lysing red blood cells with distilled water and separating the supernatant from the resulting cell debris, and (b) Adding to said supernatant a bactericidal agent in an amount to provide a concentration of from about 0.070% to about 0.20% weight/volume solution of said bactericidal agent in said supernatant, and (c) Assaying said solution for hemoglobin content and lyophilizing an aliquot of said solution such that reconstitution with water provides a hemoglobin control product with a desired hemoglobin content.

Reconstituted hemoglobin control is handled exactly as any blood specimen, and can be used in the common procedures for the determination of hemoglobin content, including the cyanmethemoglobin method, the acid hematin method, and the oxyhemoglobin method. The correct assay for the reconstituted control product will be specified for each lyophilized sample. This value will be in the normal range of the mammal for which its use is intended, e.g., approximately 16 grams of hemoglobin per 100 ml. of solution for use as a human blood control, approximately 13 grams per 100 ml. for use as a rabbit control, approximately 11 grams per 100 ml. for use as a sheep blood control. In addition, the hemoglobin control product will be available with an assay in the below-normal range of approximately 5 grams per 100 ml. Of course, the product can also be prepared with an assay outside of this range, either below 5 grams per 100 ml. or above 16 grams per 100 ml. The control should be used at least once a day whenever a series of hemoglobin determinations is to be made.

The first step of the herein disclosed method consists of washing whole mammalian blood, for example, human, sheep, or rabbit blood, but preferably whole human blood, with saline and separating the red blood cells therefrom. It is understood that the term "saline" throughout indicates a standard physiological saline solution, and in this instance refers to a 0.9% by weight aqueous sodium chloride solution. It is preferred to wash the blood two times, and more preferred to wash three times, with an equal volume of saline, and to separate by centrifugation (3300 r.p.m./20 min. each washing) and decantation.

The second step consists of lysing the resulting red blood cells, preferably by the addition of at least about 0.5 volume of distilled water, and more preferably by the addition of 1 volume of distilled water, to the cells, thoroughly agitating the mixture and allowing it then to stand for about one hour. The supernatant liquid, which now contains the hemoglobin of the cells, is separated from the cell debris, preferably by centrifugation (3300 r.p.m./20 min.) and decantation.

The third step consists of adding a bactericidal agent to the supernatant, in an amount to provide a concentration of from about 0.070% to about 0.20% weight/volume solution of said agent in the supernatant. A preferred concentration range is from about 0.075% to about 0.125% solution, and a more preferred concentration is 0.10% w./v. solution of said agent in the supernatant. A concentration of said agent below 0.070% w./v. does not provide a preservative amount of bactericidal agent, whereas a concentration in excess of 0.20% w./v. does not provide increased advantage over concentrations within the aforesaid range and is uneconomical. The bactericidal agent is selected from among suitable agents generally familiar to those skilled in the art, the most common of such agents being soduim azide and sodium merthiolate.

The fourth step of the method, which is preceded by a determination of the hemoglobin content of the solution, consists of withdrawing a measured aliquot from the solution and lyophilizing said aliquot. The size of said aliquot will be dependent upon the hemoglobin content of the solution as determined above, such that reconstitution of the lyophilized product by the addition of distilled water, and preferably by the addition of 0.5 ml. of distilled water, will provide a solution with a desired hemoglobin content. A preferred range of the final hemoglobin content is from about 5 grams of hemoglobin per 100 ml. of solution to about 17 grams of hemoglobin per 100 ml. of solution, and, when intended for use as a control for hemogolobin assays of human blood, a more preferred range is from about 6 grams per 100 ml. to about 7.5 grams per 100 ml. and from about 13 grams per 100 ml. to about 16 grams per 100 ml. When the product is intended for use as a control for assays with other mammals, these narrow ranges shall be altered to provide a normal and abnormal range appropriate to the mammal of interest.

The hemoglobin control product prepared in the aforesaid manner is made ready for use by the addition thereto of a quantity of distilled water, preferably 0.5 ml. of distilled water, followed by vigorous shaking, if necessary, to afford complete dissolution of the sample. The solution is then allowed to stand, preferably at from about 4° C. to about 10° C., for about 2 hours or until the foam settles, after which time it can be used as a regular blood specimen.

The following examples are given to more fully illustrate the present invention.

EXAMPLE I

Forty ml. of whole human blood is washed 3 times with saline, using a volume of saline equal to that of the blood for each wash, with separation by centrifugation (3300 r.p.m./20 min. each washing), yielding after the final wash 15 ml. of red blood cells. A volume of distilled water (7.5 ml.) equal to one half the volume of the resulting red blood cells is added to the cells. The mixture is thoroughly agitated and allowed to stand at room temperature for one hour, after which time it is centrifuged (3300 r.p.m./20 min.) and the supernatant is decanted therefrom. 0.0157 g. of sodium azide is added to the supernatant, providing a 0.070% w./v. solution of sodium azide in the liquid, and the resulting solution is assayed and found to contain 15 g. of hemoglobin per 100 ml. A 0.6 ml. aliquot of the solution is withdrawn and lyophilized, providing a product which, upon reconstitution with 0.5 ml. of water, will furnish a control containing 15 g. of hemoglobin per 100 ml. of solution. A second aliquot of 0.2 ml. is withdrawn and lyophilized, providing a product which, upon reconstitution with 0.5 ml. of water, will furnish a control containing 5 grams of hemoglobin per 100 ml. of solution.

EXAMPLE II

Forty ml. of whole rabbit blood is subjected to the procedure of Example I. The hemoglobin content of the solution is found by assay to be 13 g. of hemoglobin per 100 ml. A 0.6 ml. aliquot of the solution is withdrawn and lyophilized, providing a product which, upon reconstitution with 0.5 ml. of water, will furnish a control containing 13 g. of hemoglobin per 100 ml. of solution. A second aliquot of 0.23 ml. is withdrawn and lyophilized, providing a product which, upon reconstitution with 0.5 ml. of water, will furnish a control containing 5 grams of hemoglobin per 100 ml. of solution.

EXAMPLE III

Forty ml. of whole sheep blood is subjected to the procedure of Example I. The hemoglobin content of the solution is found by assay to be 11 g. of hemoglobin per 100 ml. A 0.6 ml. aliquot of the solution is withdrawn and lyophilized, providing a product which, upon reconstitution with 0.5 ml. of water, will furnish a control containing 11 g. of hemoglobin per 100 ml. of solution. A second aliquot of 0.3 ml. is withdrawn and lyophilized, providing a product which, upon reconstitution with 0.5 ml. of water, will furnish a control containing 5.5 g. of hemoglobin per 100 ml. of solution

EXAMPLE IV

The procedure of Example I is repeated wherein sodium azide (0.045 g.) is added in an amount to provide a 0.20% w./v. solution of sodium azide in the supernatant.

EXAMPLE V

The procedure of Example I is repeated wherein sodium azide is added in amounts to provide 0.075%, 0.10% and 0.125% w./v. solution of sodium azide in the supernatant.

EXAMPLE VI

The procedure of Example I is repeated wherein sodium merthiolate is used in place of sodium azide, with similar results obtained therefrom.

EXAMPLE VII

The products obtained by the procedures of Examples I–VI are reconstituted to the finished compositions suitable for control use by the following procedure:

The products obtained in the above examples are each completely dissolved in 0.5 ml. of distilled water, with vigorous shaking. The solutions are allowed to stand at about 5° C. for about 2 hours, after which time they are to be used as regular blood specimens for purposes of hemoglobin assays.

EXAMPLE VIII

Twenty microliters of hemoglobin control product, reconstituted as in Example VII above, is added to 5 ml. of Drabkin's solution, an aqueous solution containing sodium bicarbonate, potassium cyanide and potassium ferricyanide. The solution is then shaken and placed in a colorimeter; a reading is taken at 540 millimicrons and compared against a calibration curve to obtain the value of the hemoglobin content of the control product. This hemoglobin assay procedure is known as the cyanmethemoglobin method.

What is claimed is:
1. A process for the preparation of a hemoglobin control product useful for assaying hemoglobin in mammalian blood which comprises the steps of:
 (a) lysing mammalian red blood cells by agitating them with a volume of distilled water equal to at least one-half of the volume of said cells and separating the supernatant liquid from said lysed cells, and
 (b) adding to said supernatant liquid a preservative amount of a bactericidal agent to provide a concentration of from about 0.070 to about 0.200 gram thereof per 100 ml. of said supernatant, and
 (c) lyophilizing an aliquot of said resulting liquid such that reconstitution with water provides a hemoglobin control product with a desired hemoglobin content.
2. The process of claim 1 wherein said red blood cells are obtained by effectively washing whole human blood with physiological saline.
3. The process of claim 1 wherein said bactericidal agent is selected from the group consisting of sodium azide and sodium merthiolate.
4. The process of claim 1 wherein said bactericidal agent is added in an amount to provide a concentration of from about 0.075 to about 0.125 gram thereof per 100 ml. of said supernatant.
5. The hemoglobin control product as produced in the the process of claim 1.
6. A process for the preparation of a hemoglobin control product useful for assaying hemoglobin in human blood which comprises the steps of:
 (a) obtaining red blood cells by the effective washing of whole human blood with physiological saline, and
 (b) lysing said red blood cells by agitating said cells with a volume of distilled water equal to at least one half of the volume of said cells, and
 (c) allowing the resulting mixture to stand for a period of at least about one hour, and
 (d) centrifuging said resulting mixture to remove therefrom the supernatant liquid, and
 (e) adding to said supernatant liquid sodium azide in an amount to provide a concentration of from about

0.075 to about 0.125 gram of sodium azide per 100 ml. of liquid, and (f) lyophilizing an aliquot of said resulting liquid such that reconstitution with distilled water provides a hemoglobin control product with a hemoglobin content of from about 5 to about 17 grams of hemoglobin per 100 ml. of liquid.

7. The hemoglobin control product as produced in the process of claim 6.

References Cited

UNITED STATES PATENTS

| | | | |
|---|---|---|---|
| 3,000,836 | 9/1961 | Ginsburg | 252—408 |
| 3,406,121 | 10/1968 | Jones | 258—408 |

MAYER WEINBLATT, Primary Examiner

U.S. Cl. X.R.

23—230